(12) United States Patent
McKay et al.

(10) Patent No.: US 6,611,521 B1
(45) Date of Patent: Aug. 26, 2003

(54) DATA LINK LAYER EXTENSIONS TO A HIGH LATENCY WIRELESS MAC PROTOCOL

(75) Inventors: Danny N. McKay, Toronto (CA); Murray C. Baker, North York (CA); Rupam Sinha, Scarborough (CA); Nelson Jean, Thornhill (CA); Daniel Y. Wong, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/115,435

(22) Filed: Jul. 14, 1998

(51) Int. Cl.[7] ............................................. H04L 12/56
(52) U.S. Cl. ...................... 370/392; 370/394; 370/432; 370/437; 370/461; 370/462; 370/494; 714/750
(58) Field of Search .................................. 370/443, 453, 370/465, 329, 348, 331, 447, 445, 431, 436, 235, 315, 346, 396, 232, 401, 389, 229, 392, 451, 228, 420, 461, 462, 494, 437, 449; 371/32, 33, 34; 375/272, 257; 709/222, 235, 253, 232, 228, 217, 260, 322, 347, 328, 337, 394, 432; 455/517; 714/701, 776, 750

(56) References Cited

U.S. PATENT DOCUMENTS

| | | | |
|---|---|---|---|
| 4,422,171 A | * 12/1983 | Wortley et al. | 371/32 |
| 4,454,601 A | * 6/1984 | Helms et al. | 371/34 |
| 4,498,186 A | 2/1985 | Hwang et al. | 375/7 |
| 5,222,061 A | * 6/1993 | Doshi et al. | |
| 5,231,634 A | * 7/1993 | Giles et al. | 370/95.1 |
| 5,260,933 A | * 11/1993 | Rouse | 370/14 |
| 5,297,144 A | 3/1994 | Gilbert et al. | 370/95.2 |
| 5,319,648 A | * 6/1994 | Bux et al. | 714/748 |
| 5,402,422 A | * 3/1995 | Liu et al. | 370/85.5 |
| 5,528,605 A | 6/1996 | Ywoskus et al. | 371/33 |
| 5,530,693 A | 6/1996 | Averbuch et al. | 370/60 |
| 5,588,009 A | * 12/1996 | Will | 371/33 |
| 5,631,906 A | * 5/1997 | Liu | 370/455 |
| 5,745,685 A | 4/1998 | Kirchner et al. | 395/200.14 |
| 5,754,947 A | * 5/1998 | Tanabe et al. | 455/434 |
| 5,818,826 A | * 10/1998 | Gfeller et al. | 370/342 |
| 5,844,905 A | * 12/1998 | McKay et al. | 370/443 |
| 5,884,171 A | * 3/1999 | Tanabe et al. | 455/434 |
| 5,940,401 A | * 8/1999 | Frazier, Jr. et al. | 370/445 |
| 6,292,470 B1 | * 9/2001 | Uota | |

FOREIGN PATENT DOCUMENTS

| | | | |
|---|---|---|---|
| EP | 570220 A2 | 5/1993 | H04L/1/18 |
| EP | 818905 A2 | 6/1997 | H04L/29/02 |
| GB | 2301752 | 12/1996 | |
| WO | 9631077 | 10/1996 | H04Q/7/38 |

\* cited by examiner

Primary Examiner—Seema S. Rao
Assistant Examiner—Inder Pal Mehra
(74) Attorney, Agent, or Firm—Douglas W. Cameron; Anne Vachon Dougherty

(57) ABSTRACT

The invention provides a method for communication between a plurality of stations in a communication network using media access protocol, in which medium access is granted to stations obtaining a successful reservation of the medium and in which data transmission verification is performed by the protocol within the reservation. In the method a station sends a request message on the communication medium for a reservation of the medium to a recipient station in the network. The recipient station sends a reservation confirmation message back to the sending station which receives it and responds to the reservation confirmation message by sending an ordered sequence of data frames to the recipient station. After sending the ordered sequence of data frames the sending station sends an end of transmission message to the recipient station, which replies by sending back an end of transmission confirmation identifying the number of frames received in their original sequence. If the number is not correct remedial action can be taken by the sending station to resend missing data. Address conflict resolution is also provided by another aspect of the invention. The invention has embodiments which handle unicast and groupcasting transmissions.

23 Claims, 4 Drawing Sheets

DATA LINK LAYER EXTENSIONS TO A HIGH LATENCY WIRELESS MAC PROTOCOL

FIELD OF THE INVENTION

This invention is in the field of wireless communication and Media Access Control (MAC) Protocols with extensions and methods designed to improve performance in the communication environment.

BACKGROUND OF THE INVENTION

In a typical wireless communication network environment that has a number of stations, each device (network station) can be considered as having a MAC layer and a Link layer, and would require the use of MAC and Link layer protocols. The Link layer is responsible for providing address discovery, address conflict resolution, connection setup, information data exchange and disconnection services. In some networks high latency is often a big consideration due to the setup overhead required to gain access to the media. In a typical networking environment the Link layer protocol will be responsible for ensuring end to end delivery of the data. To accomplish this a typical link layer will incorporate a polling process by which control frames are periodically exchanged between the source and target device to acknowledge reception of the sent data frames. In networks that suffer from high latency the overhead incurred by utilizing this type of polling process can be very expensive (measured in terms of throughput). The cumulative effect for the entire network when considering the aggregate cost of all devices in the network is even more expensive. In a wireless network latency can be measured by the time it takes for a station to get access to the channel.

In a wireless environment, the bit-error-rate depends on the received signal quality at any specific station and on the signal-to-noise ratio (SNR) at the receiver. In general, the SNR depends on the distance of the receiver from the transmitter, the transmitted power, and the environment itself (e.g. open space, characteristics of the geographical space and materials used in the environment). Assuming a fixed transmission power and a given environment, the SNR at any receiver depends on the distance from the transmitter as well as the level of interference (e.g. measured in terms of power) at the receiver. This interference can be generated by the environment (e.g. light sources of Infrared transmission) or by the signal transmitted by other terminals. In general, depending on the interference characteristics, modulation, coding, or signal processing techniques can be used to improve the SNR at a receiver.[1] For the Infrared wireless medium, a process based on repetition coding has been proposed in [2] In this process, each symbol is transmitted n times (hence the term repetition coding) in the wireless channel. We refer to n as the repetition rate (R). The receiver in turn receives n symbols and makes a decoding decision. Now, as we increase n, the probability of receiving a symbol correctly increases and for a given bit-error-rate (BER) or signal-to-noise-ratio (SNR) at any receiver, one can find n in such a way that the probability of receiving a correct symbol is above a predefined level. As a result, the repetition rate R required to receive a symbol correctly with a predefined probability at a given receiver depends on the interference level at the receiver as well as its distance from the transmitter. Hence, since the SNR depends on the geographical placement and interference, the repetition rate necessary to achieve a given BER at a receiver is not fixed for all connections within a wireless network.

Distributed MAC protocols in a wireless CSMA/CA network are often plagued by asymmetric or hidden nodes. One common process to deal with this problem is an RTS/CTS style of MAC protocol. Now let us consider the problem of accessing the shared medium using any distributed or coordinated protocol.[2] In general, if any wireless terminal using a media access control (MAC) protocol of choice needs to transmit signals for coordinating the access to the medium, such signals need to be heard by all terminals using that medium. We refer to any signal that bears information important to the MAC protocol, media coordination, or reservation as reservation or control symbol (the control symbol can be sent from any wireless terminal in a distributed MAC and by a central coordination in a coordinated MAC). The collection of all reservation symbols in each frame conveys the reservation information that is used to follow the MAC protocol rules and specifications. There are other type of signals or symbols which we refer to as information or data symbols which are used for transferring information such as higher layer protocol data units from a transmitter to a specific receiver or a group of receivers (in case of multicast). These symbols do not bear any reservation or control meaning and hence do not need to be heard by all terminals using a shared wireless medium. Now, if reservation or control symbols are not heard by all terminals that use the shared medium, the MAC protocol rules will not be followed correctly by all stations and any station that does not receive the reservation signal might try to access the medium without being permitted. As a result, collisions may occur with a high probability and depending on the MAC protocol, the network throughput can degrade. In other words, the reservation reliability depends on the probability that all stations accessing a shared medium receive a reservation symbol and in turn the media throughput depends on the reservation reliability. Here one important issue in the design of the MAC protocol is the choice of the repetition rate R. Let us define C(I,J) as the transmission rate from station I to station J, such that the received symbol error probability at J is less than a predefined level. For a given maximum transmission rate of Cmax with R=1 where each symbols is sent only once, Cmax/C(I,J) defines the repetition rate R(I,J) that a terminal I uses to transmit symbols to J. As for choosing the repetition rate R(I,J), one can choose to transmit all symbols at the maximum repetition coding rate such that all stations accessing the shared medium can hear all transmissions (reservation and data). But this will result in the lowest achievable throughput.

The method described herein provides a process where all symbols within control (or reservation) frames and/or Data frames are sent with a repetition rate Rmax which is high enough that all stations within the interference range can decode the symbols correctly with a high probability. Consider a random access protocol based on Request-to-Send (RTS) and Clear-to-Send (CTS) as described in.[4] In the light of the above discussion on multirate communication using repetition coding, RTS and CTS packets need to be sent with a repetition coding rate Rmax which enables all terminals that share the wireless medium to receive such control packets or frames with a predefined high probability. The problem in this case is that first of all, highly repetition coded RTS or CTS packets will increase their transmission time and hence the collision window of the MAC protocol and also reduce the throughput. In addition, when the channel is reserved for an extended time by doing a burst reservation, there is a need for other terminals that are not participating in the reservation to know that the channel is in use and to hold back any transmission. Note that even when the reservation is done with Rmax, there is a possibility that some station may miss the reservation exchange. Again, in order to solve this problem, one could send all information with Rmax, but this will result in a very low throughput.

The solution to this problem as defined in [5] is to have the repetition rate R for the body of control frames less than or equal to Rmax. That is the body of control frames are transmitted with a repetition rate so that their destination can receive and decode the body with a high probability. The header is always repetition coded with Rmax so that all stations within the interference range of a transmitter can receive and decode it with a high probability. This process is designed to increase the throughput and reduce the collision window on the transmission of reservation control frames (e.g. RTS/CTS) since if MAC bodies were transmitted with the repetition code of Rmax they will have a potentially much longer transmission time and hence a larger collision window. All header fields of any frame (reservation frames or data frames) that bear any reservation specific information are repetition coded with Rmax and are in the frame header. The fields defined below are used in the header in addition to any preamble (or any other fields) required by the physical layer. We assume that source and destination addresses are within the frame body and are sent with the repetition rate R.

1—The Reservation Identification (RID) field identifies an ID associated with an ongoing reservation attempt or data exchange. Since RID is in the robust header, it is heard with a high probability by all stations with which the transmitting station can interfere. The RID is defined per reservation in a static or a random manner. That is a station that starts a reservation, can have a predefined RID defined uniquely for each destination station, or it can select a random RID for the full duration of each reservation attempt and data exchange. Another alternative use of the RID is to define it for a group of stations. In this case all stations with the same RID would have a common repetition rate R which enables them all to receive and decode the transmission of any member of the group. Any station that receives a data or control frame with a RID assigned to a group different from the one (or ones) assigned to that station, would ignore the transmission. In other words, any station tries to lock into signals transmitted at the physical layer by stations belonging to its own group (or groups).

2—The Frame Type field defines the type of the frame: Firstly, it defines: if the frame is a data frame or a control frame. Secondly, it defines the sub-types of frames within each defined type. For data frames the following types are defined: (1) Reserved Data Frames which are frames that are sent using a reservation: exchange-(2) Unreserved data frames which are frames transmitted without going through the full reservation exchange. For Control frames, at least the, following frame types are defined: Request-to-Send (RTS), Clear-to-Send (CTS), End-of-Burst (EOB), End-of-Burst-Confirmed (EOBC), and the Acknowledgement (ACK) frame 3—The Reservation Time field defines the amount of time that a medium is being reserved for. The field is carried in both the RTS and CTS control frames. When used in a data frame it describes the size of the data payload in bytes. This is also known as Block Length (BL). 4. The repetition rate RR defines the best data rate the requesting station should use to send it's data. Finally the RR* field defines the recommended rate by the target station for sending the data.

A BRIEF DESCRIPTION OF THE DRAWINGS

Figure 1:
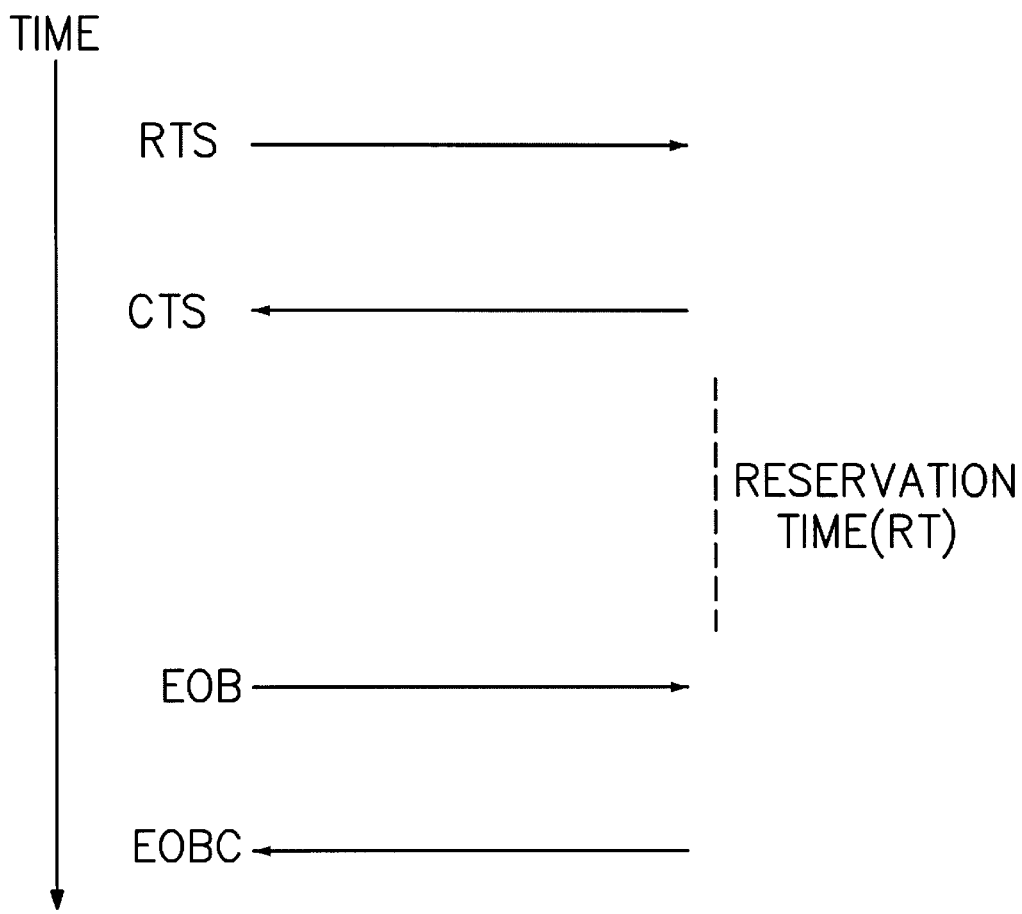
FIG. 1 is a drawing of a reservation process. It demonstrates the protocol flow between a requesting station and target station to setup and terminate a reservation.

As shown in FIG. 1 the protocol method is based on a Request-to-Send (RTS) and Clear-to-Send (CTS) frame exchange to reserve the medium before the beginning of each data transmission. In this process station (A) would send an RTS to station (B). If station (B) receives a RTS frame it would reply with a CTS to station (A). This exchange would announce to all other stations that (A) and (B) have reserved the medium for some defined period of time and will now exchange data. All other stations hearing this exchange are expected to remain quiet until the next period of media contention. The reserved period of time is known as the Reservation Time (RT). The end of the reserved period is announced by a frame exchange handshake between the 2 participating stations. Station (A) would send an End-of-Burst (EOB) request to station (B) and station (B) would reply with an End-of-Burst-Confirm (EOBC). An individual station may contend multiple times before actually winning a reservation. We refer to the time a station may wait contending for the medium as the Contention Time.

SUMMARY OF THE INVENTION

The framework of the invention provides a combination that overcomes difficulties encountered in the prior art and is capable of achieving significant performance (measured in terms of throughput) gains.

One aspect of the invention provides a method for communication between a number of stations in a communication network using media access protocol, in which transmission medium access is granted to stations obtaining a successful reservation of the medium and in which data transmission verification is performed by the protocol within the reservation. In one embodiment of the method of the invention, a station in the network that desired to make a reservation of the medium for communication to another station would send a request message on the communication medium for a reservation of the medium from one station to a recipient station in the network. The other station, the recipient station, would then send a reservation confirmation message which is received by the station requesting the reservation, and which responds to the reservation confirmation message by sending an ordered sequence of data frames (preferably sequentially numbered) to the recipient station. After sending the ordered sequence of data frames the sending station sends an end of transmission message (an end of burst message) to the recipient station, which confirms it by sending an end of transmission confirmation (end of burst confirmation) to the sending station identifying the number of frames received in their original sequence.

Preferably the end of transmission confirmation from the recipient station identifying the number of frames received in their original sequence accomplishes this by identifying the next frame expected in the sequence, from the sending station. If the next frame identified is not correct, i.e. is a frame number other than one greater than the last frame in the sequence that was sent (indicating that some data is missing or out of order), then there apparently has been a communication failure and it is preferable to have the sending station (for instance, by its communications facilities) capable of responding to this problem, for instance, by hardware or software design, e. g. in the control or link layer initiating communication, on receipt of the end of transmission confirmation. Preferably, the station will cause the transmission of the remainder of the ordered sequence of data frames to the recipient. In one approach to this the communication facilities are adapted to cause the initiation of a request for reservation of the medium to send the remainder in a similar manner as the original transmission was accomplished.

Another aspect of the invention provides a method for multicast communication between a preselected group of stations in a communications network using a medium for communications in which a station that requires communication with a group of stations sends a request message for a reservation of the medium addressed to a target station, which responds by sending a clearance to send message back to the sending station, which responds to the clear to send message by sending sequenced frames of data (carrying sequencing information, such as frame numbers) to the members of the preselected group of recipient stations at the same time. The sending stations polls selected stations in the preselected group of stations (for instance, by addressing them individually) requesting acknowledgment of the number of sequenced data frames received by the selected stations by sending polling frames addressed to these stations. These stations respond by sending sequence acknowledgment messages which are received by the sending station. The steps are repeated until all selected stations of the preselected group of stations have been polled. After this the sending station sends an end of burst message to the target station for termination of the reservation of the media, which responds by sending an end of burst confirmation message identifying how many frames have been received in their original order preferably by including in the end of burst confirmation a frame number that is next in sequence to the number of the last frame received in the original sequential order in which they were sent. If the data transmission was not successfully completed, for instance because some data frames were not received or were received in the wrong sequence the process may be repeated for the frames subsequent to those received in their original order. For instance if only the first 2 frames of a 4 frame sequence were received in the correct order the last 2 frames can be resent in a subsequent transmission reservation.

In still another aspect of the invention if an acknowledgment is not received from a polled station within a preselected time period the sending station repeats the polling of the polled station.

One aspect of the invention herein incorporates responsibilities that might be used in a link layer into a wireless MAC protocol. While it was not apparent that this approach was workable it subsequently appeared, after significant experimentation and development that significant benefits could be realized. The concepts of the invention are also well suited for other types of MAC protocols that may incur high latency. However they will not be discussed in detail here. The methods described herein are used to improve performance (measured in terms of throughput) using a typical RTS/CTS based distributed MAC protocol. Once the media has been reserved the requesting station is now free to send its data. The following utilities are designed to provide more efficient methods for this data exchange.

Figure 2:
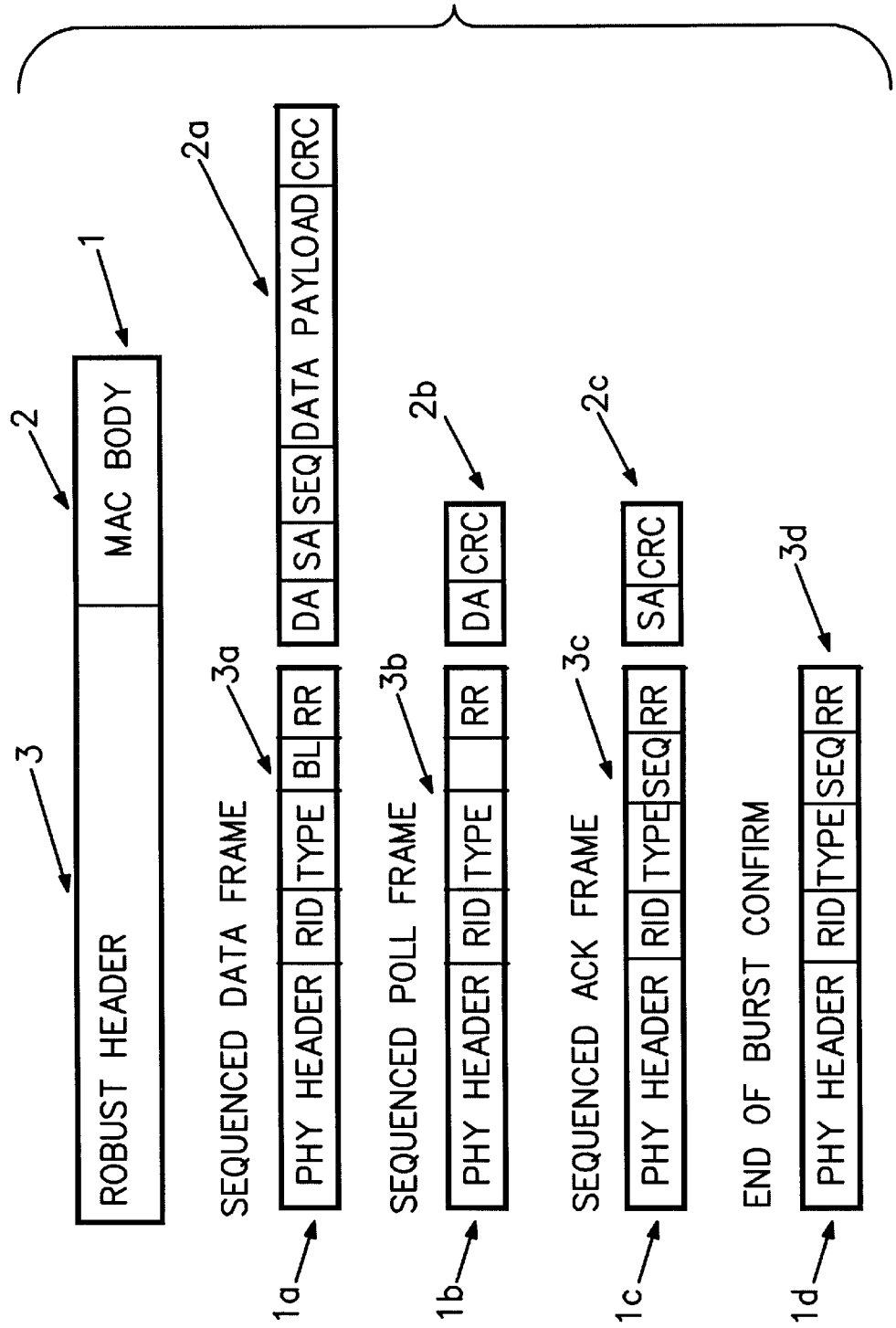
FIG. 2 is a drawing of the new frame type "s" created for this invention. The figure describes the fields used in the header and body of the new MAC frames invented.

The Sequenced Data Transfer Modes allow the MAC to send MAC level sequenced data frames inside a reservation and get instant feedback from the target station indicating whether frames were successfully received in sequence. This is accomplished by using a SEQ field in the body of the MAC SDATA frame as defined in FIG. 2. The target EOBC response frame carries the sequence results from the target station The Groupcast Transfer mode provides a MAC level reliable multicast (group address) data transfer process which can provide immediate target station feedback to the MAC user from each member in the group multicast.

The address conflict resolution process provides a mechanism to perform MAC level address conflict resolution without involving the user of the MAC protocol (ie. A Link Control Protocol ). The MAC will provide a local address mapping using the Link address and the local MAC address. Upon detection of a duplicate MAC address the local address table will be updated and remapped using the new MAC address in the table. The conflict resolution process will be isolated from the upper protocol layer and will not have any awareness of the change.

DETAILED DESCRIPTION OF THE PREFERRED EMBODIMENT

In this section we will describe the methods of the invention using a distributed CSMA/CA type of MAC protocol with repetition coding as described in the background. The invention contains several new frame types, control frames, header and MAC body fields as illustrated in detail in FIG. 2.

Three new frame types were invented to compliment the MAC protocol, namely the Sequenced Data frame (SDATA), Sequenced Poll frame (SPOLL) and the Sequenced Acknowledgment (SACK) frame. The SDATA frame has a new sequence field which has been added to the MAC body of the frame. The SPOLL frame is a simple header with a remote unicast destination address (DA) field contained in the MAC body. The SACK frame is a simple header with the remote unicast source address (SA) which should be identical to the (DA) field of the SPOLL contained in the MAC body. The SPOLL is used to poll remote stations to identify whether the data previously sent was received successfully in sequence. The SACK frame provides the target stations response to the POLL.

The EOBC header was also modified to add a new Sequence (SEQ) field to provide a means for the target station to feedback status for previously transmitted data frames received successfully in sequence without error.

Process 1: Sequenced Data Transfer Modes

Figure 3:
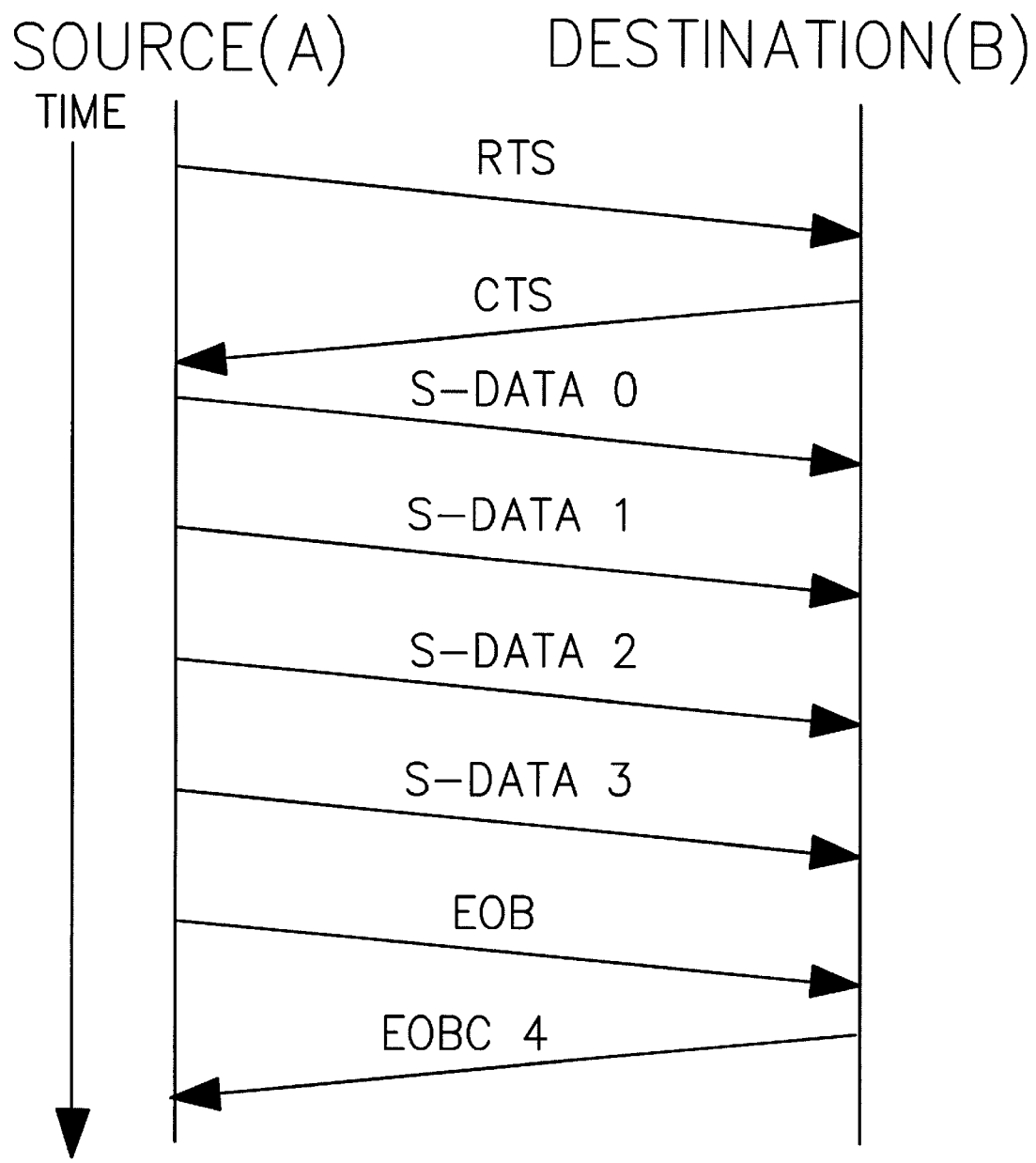
FIG. 3 is a drawing of sequenced data transfer scenario between only 2 stations. It displays the reservation process and sequenced information exchange between the requester and target station.

The basis for the invention is to provide a sequencing feature for data frames sent at the MAC level to reduce the dependency on Link Layer polling. Frames which are successfully received in sequence will be acknowledged immediately to the upper link layer and will not require a polling sequence. In networks that incur high latency this is a valuable savings. Even networks that do not incur a high latency will still realize some performance gains. In this process, illustrated in FIG. 3, a station (A) would contend for the channel using the previously defined RTS/CTS process. The destination field in the MAC body of the RTS frame from (A) is required to be a unicast address directed at a specific target station (B) as this process is only applicable for a burst of data between 2 stations. Upon reception of the CTS from (B) the requesting station (A) will begin sending the sequenced data (SDATA) frames to (B). The SDATA frames sent to (B) are required to use a unicast address field for the destination address (DA) in the MAC body. Each consecutive SDATA frame within the reservation burst will provide an incrementing number in the SEQ field of the MAC body. After the last SDATA frame is transmitted then (A) will begin termination of the reservation using an EOB frame. Upon reception of the EOB frame (B) will return to (A) an EOBC to complete the termination handshake. The EOBC returned from (B) to (A) will contain a new SEQ field which will indicate the number of frames received successfully in their original sequence during the reservation burst. The SEQ counter on both stations will be reset at the end of the reservation. The sequence counter could start at any known position, the typical value used would be zero or one. If a station (A) were to send 4 frames to station (B) upon terminating the reservation the target station would inform the requesting station of the next frame expected in sequence. If a frame was received out of sequence the target station (B) would stop incrementing it's sequence counter and tell the requesting station (A) to retransmit at the point data was received out of order from it's original sequence. The requesting station (A) can pass this information to the Link layer user of the MAC. If the user of the MAC is informed all data frames were received correctly it will no longer be required to poll the remote station to discover this information. The polling requirement would now only be necessary in cases where the EOBC frame was lost. Two possible outcomes can happen at station (A). If the EOBC frame was received by (A) then the link layer will know immediately which frames were lost and can begin error recovery immediately. However, if the EOBC frame was lost then the link layer will not know which frames were successfully received and a polling sequence would know be required. This complete process will result in a valuable reduction in Link layer overhead and reduce the amount of time the station would spend contending for the media.

Pseudo Code Explanation for Sequenced Data Transfer Mode listening on the group address will receive the data. The main motivation behind this style of addressing process is it allows a single transmit request to be heard by multiple stations simultaneously. However, in wireless protocol schemes you are often not sure whether all the target stations can all hear the transmitting source device. The basic idea with groupcasting is to provide a reliable transfer mode with group addressing (multicast) by providing confirmation that the data was actually successfully received in its original sequence. The fact that this is all performed at the MAC level provides additional performance (measured in terms of throughput) advantages that could not be achieved by using this process at an upper protocol layer. The Groupcasting transfer mode is similar to the Sequenced Data transfer mode except for the fact that the transmission now involves multiple intended receivers.

Figure 4:
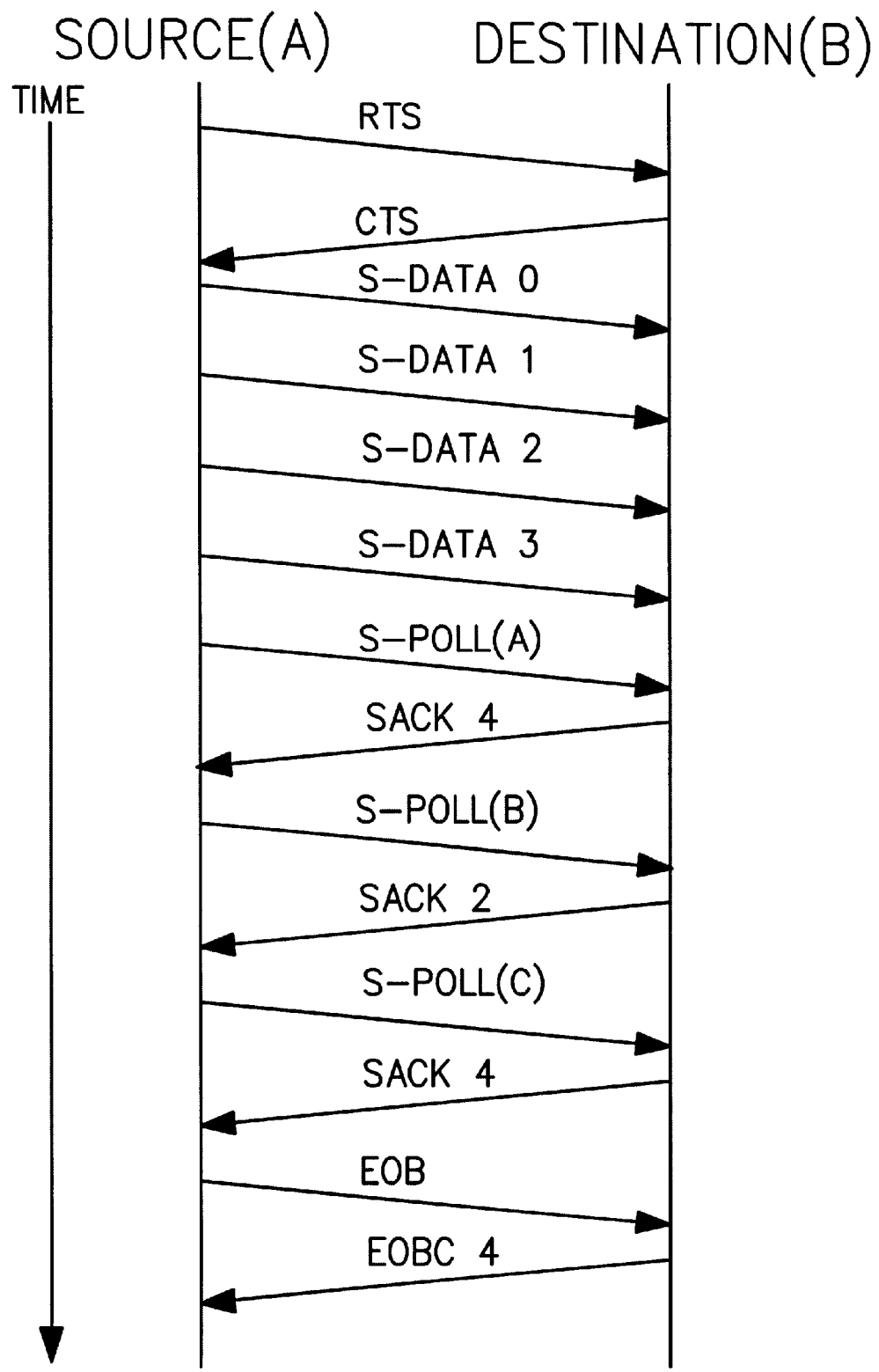
FIG. 4 is a drawing of a groupcast data transfer. It displays a sequenced data exchange between the requestor and multiple target stations.

In this process, as illustrated in FIG. 4, the source station (A) will contend for and reserve the medium with a target station (B). The target station (B) may be optionally part of the group. When the media has been reserved (A) will send a burst of SDATA frames using a multicast (Group) destination address (DA). In this scenario, it is expected that (B) would be a member of the group listening on the group address. We send 4 Sequenced Data frames, as described in the previous process the SEQ parameter is incremented for each consecutive SDATA frame. When the requesting station (A) has finished transmitting the sequence of SDATA frames it will then proceed to individually poll each member of the group. The requesting station could also optionally select to only poll a select subset of the group. A group registration procedure would need to be defined to enable the source station (A) to know all remote stations associated to the specific group address. (A) will then proceed to poll each individual member of the group. The polling procedure is completed by (A) sending an SPOLL frame to a target station identified by the unicast (DA) in the MAC body. The target station at which the SPOLL frame was directed will reply with a SACK frame. The header of the SACK frame

```
IF ( MEDIUM IS IDLE )
    SEND RTS Frame
    IF ( CTS Frame received )
        Set SEQ counter to 0 in 1st SDATA frame
        Send SDATA frame
        LOOP
            Increment SEQ counter
            Send SDATA frame
            Repeat loop until all SDATA frames transmitted
        ENDLOOP
        SEND EOB Frame
        IF ( EOBC Frame received )
            Extract the SEQ field from the received EOBC frame
            Inform Link Control number frames successfully received in sequence
            Link Control begins error recovery for lost data if any encountered
        ELSE
            Inform Link Control no transmit confirmation available
            Link Control begins polling sequence.
    ELSE
        GO Back and RETRY RTS again
ELSE
    WAIT FOR IDLE MEDIUM
```

Process 2: Groupcasting with SPOLL and SACK Frames

Many networking protocols use the concept of group addressing or multicast addressing schemes. The basic principal is that you provide a unique address shared by multiple stations. When data is sent to the group address all stations will provide the SEQ field from the target station and will identify the next frame expected in sequence to be received by the target station in this reservation burst. The body of the SACK frame will include the (SA) field for the responding station and will be identical to the (DA) provided in the SPOLL frame. A timeout facility has been incorporated on the requesting station (A) to handle the case where the SACK response from (B) may get lost and not be received at (A). In such cases (A) could attempt to retransmit the SPOLL frame within the reservation and repeat the previously described procedures. A retry limit would be defined to control the number of times (A) would be allowed to attempt to get a response to the SPOLL. The SPOLL and SACK exchange between (A) and the next target device would then be repeated for every unicast (DA) address included in the group. When all target devices in the group has been polled the source station (A) will then terminate the reservation by using the EOB/EOBC handshake termination. The requesting station (A) also has the optional facility of polling the target station (B) explicitly to receive the SEQ results or it may rely on the SEQ field in the EOBC frame. Providing the SEQ field on the EOBC would eliminate the need of polling the station used to establish the reservation. After all stations have been polled and the reservation has been terminated the MAC will report to the upper Link layer the status of the transmitted data. If all stations received the intended data then no other actions are required at the link layer. However, if data loss was detected then the link layer can perform it's error recovery procedures. In the example shown in FIG. 4 you can see a situation where station (A) and (C) received all 4 frames correctly in their original sequence. However, station (B) only received the first 2 frames correctly. The link layer can now use this information & When performing link layer recovery.

Pseudo Code Explanation for Groupcasting Data Transfer Mode protocol would be responsible for identifying address collisions and taking procedures to resolve them. The benefits of this new invention is the MAC will be able to detect and resolve the address conflict quicker and easier than upper layer Link Control protocols. Also, the MAC protocol will provide a local mapping of the MAC address to isolate the dynamic process from the upper layer protocol. This will allow the MAC to reassign a new MAC address with no involvement required by the upperlayer Link protocol.

In this process, this aspect of the invention would involve the MAC protocol assuming the responsibility for Address Conflict Resolution. The source station will listen to all received MAC frames which are using a (SA) field. Examples of these frames would include all types of DATA frames and the SACK frame. If a (SA) is detected with a matching value and the frame is received without errors (ie no CRC error detected) then the conflict is detected and reported. The MAC protocol performs this check on every frame received carrying an (SA). Upon detection the MAC will reassign a new value for it's own MAC address and update the address mapping table. The MAC station would also need to inform all stations it was in communication with of it's new address. The process could also be applied to resolve duplicate addresses on behalf of other stations in the network. This would be accomplished using the address mapping table with Link Control and MAC address pairings. A received MAC address paired with an LC address different than identified in the address table would be used to identify the owning station of the conflict.

In the preceding description pseudocode examples have been provided for a more thorough understanding of

```
IF ( MEDIUM IS IDLE )
    SEND RTS Frame
    IF ( CTS Frame received )
        Set SEQ counter to 0 in 1st SDATA frame
        Send SDATA frame with Group address
        LOOP
            Increment SEQ counter
            Send SDATA frame with group address
            Repeat loop until all SDATA frames transmitted
        ENDLOOP
        POLL LOOP
            Send Poll frame to remote station using unicast address
            IF (SACK frame received from remote station)
                Extract the SEQ field from the received SACK frame
            ELSE
                IF (poll retry limit exceeded)
                    move on to the next station to poll
                ELSE
                    resend the poll frame
            Repeat POLL LOOP for each member until all SPOLL frames transmitted
        END POLL LOOP
        SEND EOB Frame
        IF ( EOBC Frame received )
            Extract the SEQ field from the received EOBC frame
        ELSE
            Inform Link Control no transmit confirmation available for target station
            Link Control begins polling sequence for target station.
        Inform Link Control number frames received in sequence by the group
        Link Control begins error recovery for lost data if any encountered
    ELSE
        GO Back and RETRY RTS again
ELSE
    WAIT FOR IDLE MEDIUM
```

Process 3: Address Conflict Detection with Local Address Mapping

All MAC layer protocols use some form of addressing process to uniquely identify each station. Typically a link described embodiments of the invention. Various applications of the pseudocode will be evident to those skilled in the art, as depending on the objectives and equipment used for communications network stations the pseudocode could be used for the basis of software, micro code or hardware implementation.

References

[1] J. Proakis and M. Salehi, "Communication Systems Engineering", Prentice Hall, 1994

[2] F. Gfeller, W. Hirt, M. de Lange, and Beat Weiss, "Wireless Infrared Transmission: How to reach All Office Space", Proceedings of IEEE VTC, Atlanta, 4/1996

[3] M. Schwartz, "Telecommunications Networks; Protocols, Modeling, and Analysis", 1987

[4] V. Bhargavan, A. Demers, S. Shenker, L. Zhang, "MACAW: A Media Access Protocol for Wireless LANs" Proceeding of SIGCOMM 94, London, England, 8/94

[5] F. Gfeller, P. Hortensius, M. Naghshineh, C. Olsen, P. Kermani, P. Kam, D. McKay, "Media Access Control Protocols in a Wireless Communication Network Supporting Multiple Transmission Rates", Disclosure Application Serial number 664718, filed Jun. 17, 1996.

The embodiments of the invention in which an exclusive property or privilege is claimed are defined as follows:

1. A method for multicast communication between a preselected group from a plurality of stations along a communication medium in a communication network using media access protocol, in which access to said medium is granted to stations obtaining a successful reservation of the communication medium and in which data transmission verification is performed by said protocol within said reservation, comprising:

a method in which a first station:
sends a request message on said communication medium for a reservation of said medium from said first station to a recipient station in said network;
receives from said recipient station a reservation confirmation message;
responds to said reservation confirmation message by sending an ordered sequence of data frames to said recipient station;
after sending said ordered sequence of data frames, sends an end of transmission message to said recipient station; and
receives an end of transmission confirmation from said recipient station identifying the number of frames received in their original sequence,
wherein communication link control means initiates said communication method, wherein said communication link control means is adapted to respond to receipt of said end of transmission confirmation if said number of frames received in their original sequence is less than the number of frames originally sent;
wherein said group is a preselected group of said plurality of stations and wherein:
said first station
sends a request message for a reservation of said medium addressed to a target station;
receives a clear to send message from said target station; responds to said clear to send message by sending a number of sequenced ordered frames of data to said preselected group of recipient stations;
polls selected stations in said preselected group of stations requesting acknowledgment of the number of sequenced data frames received by said selected stations by sending polling frames individually addressed to said selected stations in said preselected group of recipient stations;
receives sequence acknowledgment messages from said selected stations;
repeats said previous two steps until all selected stations of said preselected group of stations have been polled;
sends an end of burst message to said target station for termination of the reservation of said media; and
receives an end of burst confirmation from said target station identifying as a frame number a number that is next in sequence to the number of the last frame received by said recipient for those frames that were received in their original sequential order.

2. The method of claim 1 wherein said end of transmission confirmation from said recipient station identifying the number of frames received in their original sequence identifies a next frame expected in said sequence.

3. The method of claim 1 wherein said communication link control means is adapted to cause the transmission of the remainder of said ordered sequence of data frames to said recipient.

4. The method of claim 3 wherein said communication link control means is adapted to cause the initiation of a request for reservation of said medium to send said remainder.

5. The method of claim 1 wherein said first station:
sends a clearance to send request transmission over said media addressed to a recipient station;
receives a clear to send message from said recipient station;
responds to receipt of said clear to send message from said recipient by sending a sequentially numbered series of data frames to said recipient;
after sending said series of data frames, sends an end of transmission burst message to said recipient; and
receives from said recipient an end of transmission burst message confirmation identifying a frame number that is next in sequence to the number of the last frame received by said recipient for those frames that were received in their original sequential order, and
wherein said first station is adapted to respond to said end of burst message confirmation if said frame number received is not the next number in sequence to the number of the last frame originally sent.

6. The method of claim 5 wherein said communication link control means is adapted to cause the transmission of the remainder of said ordered sequence of data frames to said recipient.

7. The method of claim 6 wherein said communication link control means is adapted to cause the initiation of a request for reservation of said medium to send said remainder.

8. The method of claim 1 wherein communication link control means initiates said communication method, wherein said communication link control means is adapted to respond to receipt of said end of transmission confirmation if said number of frames received in their original sequence is less than the number of frames originally sent.

9. The method of claim 8 wherein said communication link control means is adapted to cause the transmission of the remainder of said ordered sequence of data frames to said recipient.

10. The method of claim 9 wherein said communication link control means is adapted to cause the initiation of a request for reservation of said medium to send said remainder.

11. The method of claim 1 further including address conflict resolution process provides a mechanism to perform media access level address conflict resolution by providing local address mapping at each station using a Link address and a local media address whereupon on detection of a duplicate media access address said local address table will be updated and remapped using a new media access address in said table.

12. A method for multicast communication between a group preselected from a plurality of stations along a communication medium in a communication network using media access protocol, in which access to said medium is granted to stations obtaining a successful reservation of the communication medium and in which data transmission verification is performed by said protocol within said reservation, comprising:

a method in which a first station:
sends a request message on said communication medium for a reservation of said medium from said first station to a recipient station in said network;
receives from said recipient station a reservation confirmation message;
responds to said reservation confirmation message by sending an ordered sequence of data frames to said recipient station; after sending said ordered sequence of data frames, sends an end of transmission message to said recipient station; and
receives an end of transmission confirmation from said recipient station identifying the number of frames received in their original sequence, wherein communication link control means initiates said communication method, wherein said communication link control means is adapted to respond to receipt of said end of transmission confirmation if said number of frames received in their original sequence is less than the number of frames originally sent;

wherein said group comprises a preselected group of said plurality of stations and wherein:
said first station
sends a request message for a reservation of said medium addressed to a target station;
receives a clear to send message from said target station; responds to said clear to send message by sending a number of sequenced ordered frames of data to said preselected group of recipient stations;
individually polls selected stations in said preselected group of stations requesting acknowledgment of the number of sequenced data frames received by said selected stations by sending individual poll frames addressed respectively to each of said selected stations in said preselected group of recipient stations;
receives sequence acknowledgment frames from said selected stations that were polled;
repeats said previous two steps until all selected stations of said preselected group of stations have been polled;
sends an end of burst message to said target station for termination of the reservation of said media; and
receives an end of burst confirmation from said target station identifying as a frame number a number that is next in sequence to the number of the last frame received by said recipient for those frames that were received in their original sequential order.

13. The method of claim 12 wherein communication link control means initiates said communication method, wherein said communication link control means is adapted to respond to receipt of said end of transmission confirmation if said number of frames received in their original sequence -is less than the number of frames originally sent.

14. The method of claim 13 wherein said communication link control means is adapted to cause the transmission of the remainder of said ordered sequence of data frames to said recipient.

15. The method of claim 14 wherein said communication link control means is adapted to cause the initiation of a request for reservation of said medium to send said remainder.

16. The method of claim 12 wherein if an acknowledgement is not received from a polled station within a preselected time period said first station repeats the polling of said polled station.

17. Communication means for use in a media access protocol for performing multicast communication in accordance with claim 12 between a preselected group of said plurality of stations comprising:

communication frame means for transmitting information between said stations, said frame means comprising:
sequenced data frames including data sequence information;
sequenced poll frames addressed to selected recipient stations respectively,
sequenced acknowledgment frames addressed to said first station including sequence information of information received by said selected recipients from which said sequenced acknowledgment frames were sent; and
an end of transmission confirmation frame including sequence information of information received by a station from which said frame was sent.

18. Apparatus of claim 17 wherein said apparatus is embodied in programming means stored on a media capable of being used by stations of communication network.

19. Apparatus for communication between a plurality of stations along a communication medium in a communication network using media access protocol, in which access to said communication medium is granted to stations obtaining a successful reservation of the communication medium and in which data transmission verification is performed by said protocol within said reservation, comprising:

requesting means at a first station for sending a request message on said communication medium for a reservation of said medium from said first station to a recipient station in said network;
receiving means at said first station for receiving from said recipient station a reservation confirmation message;
data sending means responsive to said reservation confirmation message for sending an ordered sequence of data frames carrying ordering information to said recipient station;
reservation termination means for sending an end of transmission message to said recipient station after said sending of said data frames; and, for responding to an end of transmission confirmation from said recipient station identifying the number of frames received in their original sequence for the termination of said reservation;
end of transmission confirmation means for generating an end of transmission confirmation message identifying the number of frames received in their original sequence by identifying a next frame expected in said sequence; and
means adapted to cause the transmission of the remainder of said ordered sequence of data frames when an incomplete sequence of frames is received.

20. Apparatus for communication between a plurality of stations along a communication medium in a communication network using media access protocol, in which access to said communication medium is granted to stations obtaining a successful reservation of the communication medium and in which data transmission verification is performed by said protocol within said reservation, comprising:

requesting means at a first station for sending a request message on said communication medium for a reservation of said medium from said first station to a recipient station in said network;

receiving means at said first station for receiving from said recipient station a reservation confirmation message;

data sending means responsive to said reservation confirmation message for sending an ordered sequence of data frames carrying ordering information to said recipient station;

reservation termination means for sending an end of transmission message to said recipient station after said sending of said data frames; and, for responding to an end of transmission confirmation from said recipient station identifying the number of frames received in their original sequence for the termination of said reservation;

end of transmission confirmation means for generating an end of transmission confirmation message identifying the number of frames received in their original sequence by identifying a next frame expected in said sequence; and further adapted for multicast communication between a preselected group of said plurality of stations in said communications network comprising:

requesting means at a first station for sending a request message for a reservation of said medium addressed to a target station;

response means for receiving a clear to send message from said target station, and for responding to said clear to send message by sending a number of sequenced ordered frames of data to said preselected group of recipient stations;

polling means for individually polling selected stations in said preselected group of stations requesting acknowledgment of the number of sequenced data frames received by said selected stations by sending polling frames addressed to said selected stations in said preselected group of recipient stations;

sequence acknowledgment receiving means for receiving sequence acknowledgment messages from said selected stations; end of reservation burst messaging means for sending an end of burst message to said target station for termination of the reservation of said media; and end of burst receiving means for receiving an end of burst confirmation from said target station identifying as a frame number a number that is next in sequence to the number of the last frame received by said recipient for those frames that were received in their original sequential order.

21. The apparatus of claim 20 further including means responsive to receipt of said end of transmission confirmation if said number of frames received in their original sequence is less than the number of frames originally sent and to transmit the remainder of said ordered sequence of data frames to said recipient during a subsequent reservation.

22. The apparatus of claim 20 further including means for address conflict resolution process comprising:

means for performing media access level address conflict resolution by providing a local address mapping at a station using a Link address and a local media address for responding to detection of a duplicate media access address said local address table will be updated and remapped using a new media access address in said table.

23. The apparatus of claim 20 further including means for address conflict resolution process comprising:

means for performing media access level address conflict resolution by providing a local address mapping at a station using a Link address and a local media address for responding to detection of a duplicate media access address said local address table will be updated and remapped using a new media access address in said table.

* * * * *